UNITED STATES PATENT OFFICE.

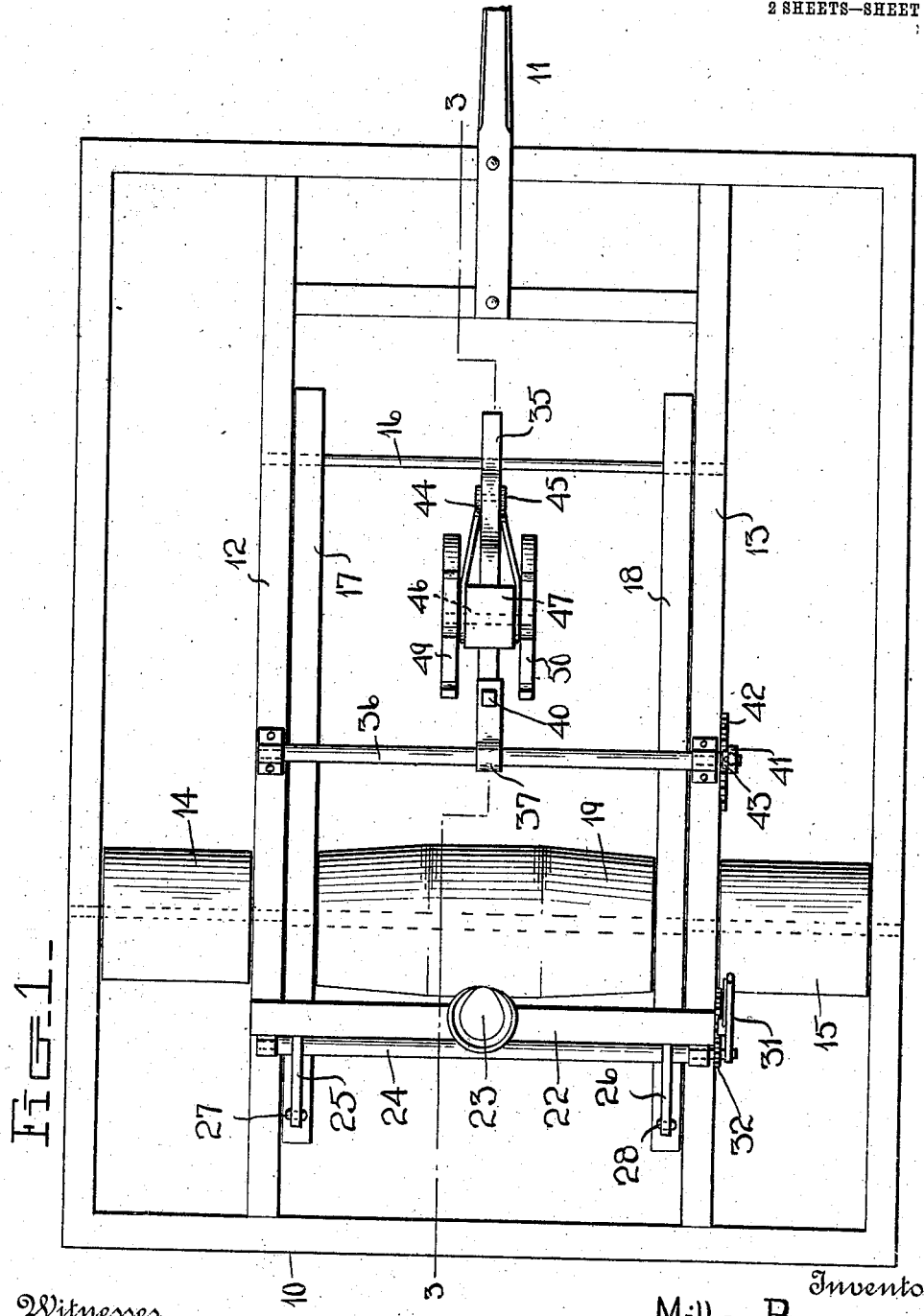

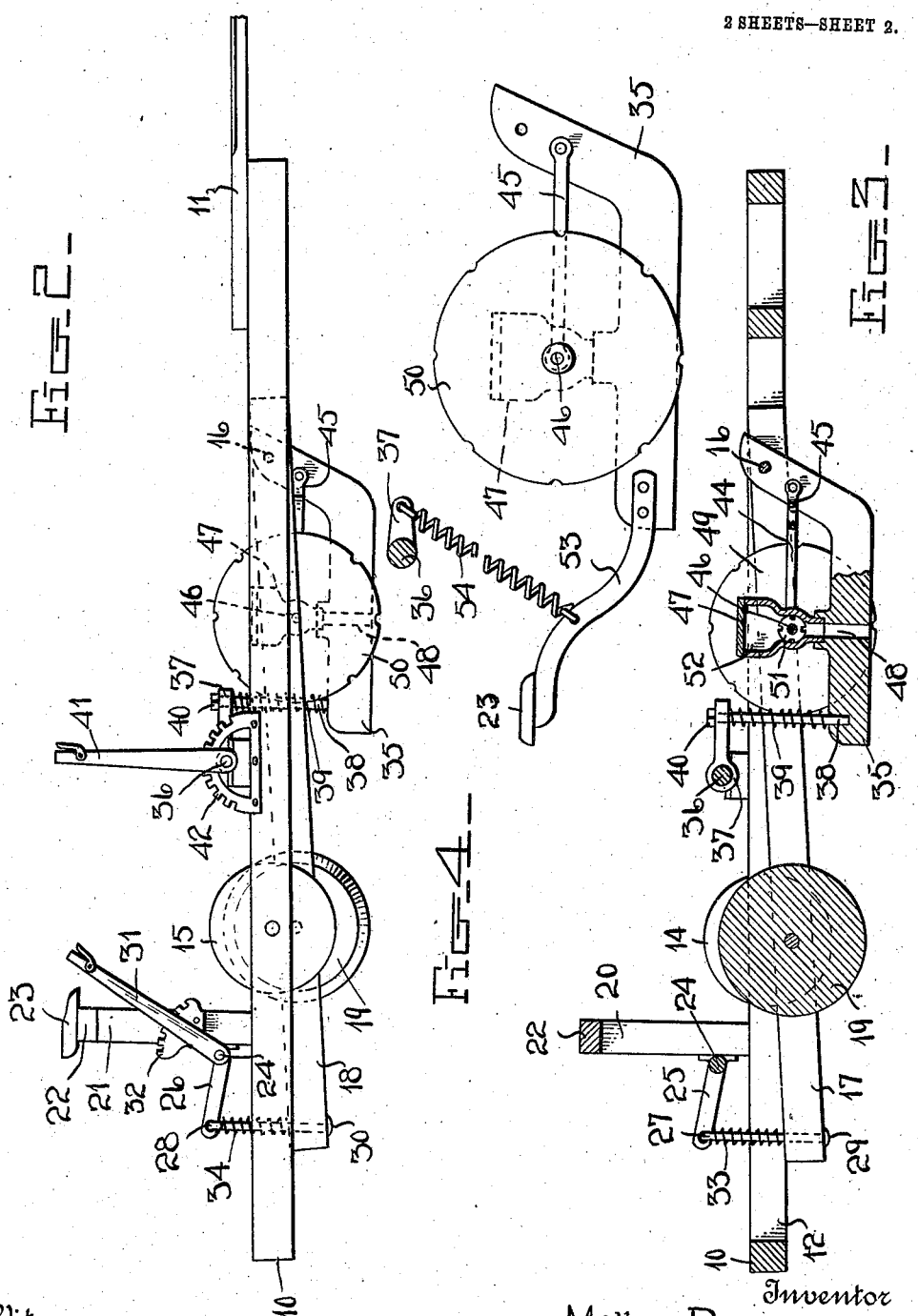

MILLER BROWN, OF RICHMOND, MISSOURI.

COMBINED LISTER, PLANTER, AND ROLLER.

No. 848,154.

Specification of Letters Patent.

Patented March 26, 1907.

Application filed November 5, 1906. Serial No. 342,082.

*To all whom it may concern:*

Be it known that I, MILLER BROWN, a citizen of the United States, residing at Richmond, in the county of Ray and State of Missouri, have invented certain new and useful Improvements in Combined Listers, Planters, and Rollers; and I do declare the following to be a full, clear, and exact description of the invention, such as will enable others skilled in the art to which it appertains to make and use the same.

This invention relates to implements for planting corn and for analogous purposes, and has for its object to provide a simply-constructed and efficient device whereby the corn may be planted and rolled in the bottom of the furrow formed by the lister implement; and the invention consists in certain novel features of construction herein shown and described, and as specifically pointed out in the claims.

In the drawings illustrative of the embodiment of the invention is shown the preferred form of carrying the same into operation, and in the drawings thus employed Figure 1 is a plan view of the improved device. Fig. 2 is a side elevation. Fig. 3 is a longitudinal sectional view on the line 3 3 of Fig. 1, and Fig. 4 is a detail view showing modified means for actuating the shoe.

The improved device comprises a supporting-frame 10, preferably oblong in shape and provided with suitable means, such as a draft-tongue 11, to which the draft-animals are attached in the ordinary manner.

The frame 10 is provided with spaced longitudinal members 12 13, and journaled between these spaced members and the side members of the frame are relatively small rollers 14 15, the frame being large enough transversely to enable the rollers 14 15 to travel upon the top of the ridges at the sides of one of the listed furrows.

Extending through the spaced frame members 12 13 is a relatively heavy rod 16, and swinging from this rod are spaced bars 17 18, upon which a relatively large roller 19 is mounted for rotation, the large roller being reduced in size toward the ends and adapted to travel in the listed furrow between the ridges. Rising from the frame members 12 13 are standards 20 21, connected at their upper end by a cross-bar 22, the latter being utilized to support the driver's seat, (represented at 23.)

Mounted for rotation transversely of standards 20 21 is a shaft 24, having arms 25 26 extending laterally therefrom in alinement with the swinging members 17 18. Connecting the arms 25 26 with the swinging members 17 18 are rods 27 28. The rods are movable through the swinging members and provided at their lower ends with heads 29 30 to limit the downward movement. The rods 27 28 are surrounded by springs 33 34, bearing at their ends against the arms 25 26, and the swinging members 17 18.

The shaft 24 is provided with a hand-lever 31, operating against a toothed segment 32, the hand-lever having a spring-actuated pawl adapted to engage the teeth of the segment, and thus enable the lever to be held in any desired position. By this simple arrangement it will be obvious that the frame members 17 18 may be adjusted vertically to any desired extent, and thus hold the large roller 19 at any desired position relative to the side rollers 14 15 and the furrow in which the large roller runs. The large roller 19 may thus be adapted to any depth of furrow.

The rods 27 28 hold the frame members 17 18 together with the roller 19 from downward movement; but the springs 33 34 provide for the upward movement of the frames independently of the arms 25 26 and the shaft 24 in event of abnormal obstructions being encountered by the roller, and thus avoid the breakage of any of the parts.

The springs 33 34 will possess sufficient strength to prevent any upward movement of the large roller and its frame under normal conditions, but will yield under abnormal conditions, as will be obvious.

Swinging from the rod 16 is a seeding-shoe or furrow-opener 35 of the ordinary construction, and mounted for rotation transversely of the frame members 12 13 is a rock-shaft 36, having a lateral arm 37, coupled by a rod 38 to the shoe, the rod loosely engaging the free end of the arm 37 and provided with a head 40, bearing upon the upper face of the arm. By this simple arrangement when the arm 37 is elevated by the rotation of the shaft 36 it will carry the rod and the shoe connected thereto with it but in event of the shoe meeting with obstructions it will in rising carry the rod through the arm 37 without affecting it, and thus avoid breakage of any of the parts.

A spring 39 is disposed upon the rod 38 and bears by its ends respectively beneath the arm 37 and above the shoe 35, thus providing a yieldable connection between the shoe and the arm for obvious reasons.

The shaft 36 is provided with a hand-lever 41, operating over a toothed segment 42, and may be provided with the ordinary spring-controlled pawl for engaging the teeth of the segment, and thus provide for holding the shaft 36 and its arm 37 in any desired position. By this means the shoe can be adjusted to any desired position relative to the main frame and will be readily held from downward movement, but will yield under abnormal conditions, as will be obvious.

Swinging from the shoe 35 are parallel bars 44 45, journaled at their rear ends to a shaft or axle 46, the latter extending through a seeding apparatus, (represented as a whole at 47,) the seeding apparatus resting normally upon the upper end of the seed-conduit 48, forming a part of the shoe. The shaft 46 is provided with ground-wheels 49 50, bearing upon the ground at opposite sides of the shoe. The shaft 46 will be provided with a suitable seed-dropping mechanism, (represented conventionally at 51) operating in the casing 52. In Fig. 4 is shown a detail view of a modified means for actuating the shoe consisting in attaching to the rear of the shoe a foot-lever 53, and connecting the foot-lever with the arm 36 is a relatively powerful spring 54, the spring 54 taking the place of the rod 38 of the spring 39. By this means the shoe may be depressed when required by the pressure of the foot of the operator from the seat 23. In this modified construction it will be obvious that the normal position of the shoe is controlled by the hand-lever 41 and the segment 42 in the same manner as in the structure shown in Figs. 1 and 2, the shoe being held yieldably by the spring 54 and operating in the same manner.

It will be noted that the seeding mechanism is free to swing upwardly to any desired extent through the action of the bars 44 45 when required or when the seeder is not in use or for any other purpose.

The swinging arrangement of the seeding devices also renders the seeding apparatus easily accessible when the seeding-wheel or other parts are to be changed or repaired.

Having thus described my invention, what is claimed as new is—

1. In a device of the class described, a main frame carrying relatively small rollers spaced apart and adapted to travel upon the ridges at the sides of a listed furrow, an inner frame swinging from the main frame and carrying a relatively large roller adapted to operate within the listed furrow, means for adjusting said inner frame and the roller carried thereby vertically, a planter-shoe swinging from said main frame in advance of the large roller, feeding devices carried by said shoe, and means for adjusting the free end of said shoe vertically.

2. In a device of the class described, a main frame carrying relatively small rollers spaced apart and adapted to bear upon the ridges at the sides of a listed furrow, an inner frame swinging from said main frame and carrying a relatively large roller operating within said listed furrow, means for adjusting the rear end of said inner frame vertically, a furrow-opening shoe swinging from the main frame in advance of the large roller, seeding devices carried by said shoe, and means for adjusting the near end of said shoe and seeding devices vertically.

3. In a device of the class described, the combination with a main frame having relatively small spaced rollers for moving upon the ridges at the sides of a listed furrow, a relatively large roller between said smaller roller, and adapted to travel in said listed furrow, means for adjusting said larger roller vertically, seeding devices carried by said frame in advance of said larger roller, and means for adjusting said seeding devices vertically.

4. In a device of the class described, the combination with a main frame having relatively small spaced rollers for moving upon the ridges at the sides of a listed furrow, a relatively large roller between the said small rollers and adapted to move in said furrow, yieldable means for supporting said larger roller, means for adjusting said larger roller vertically, a seeding-shoe carried by said frame in advance of said larger roller, seeding devices associated with said shoe, means for yieldably supporting said shoe, and means for adjusting said shoe and the seeding devices associated therewith vertically.

5. In a device of the class described, a frame having longitudinal members spaced apart and at a distance from the sides of the frame, a roller journaled between each of said members and the sides of the frame, respectively, spaced bars suspended between said members, a roller journaled therein, and a furrow-opener in front of said last-mentioned roller.

6. In a device of the class described, a frame provided with spaced longitudinal members, rollers therein, spaced bars suspended between said members, a roller and a furrow-opener carried by said bars, two shafts journaled across the frame, means for adjustably connecting said shafts with the roller and the furrow-opener, respectively, and means for adjustably rotating each shaft.

7. In a device of the class described, a frame provided with spaced longitudinal members, rollers therein, a rod in said members, spaced bars and a furrow-opener pivotally connected with said rod, means for adjustably controlling the movements of the opener and the bars respectively, and a roller mounted in said bars to the rear of the furrow-opener.

8. In a device of the class described, a frame provided with rollers, a transversely-disposed rod secured to said frame, spaced bars and a furrow-opener, each pivotally secured at its forward end to said rod, two shafts across the frame, each provided with means for adjustably rotating it and with an arm, rods respectively connecting said arms to the said bars and the said furrow-opener, and springs on said rods and coacting therewith to form yieldable connections between said arms and said bars and furrow-opener.

In testimony whereof I have hereunto set my hand in presence of two subscribing witnesses.

MILLER BROWN.

Witnesses:
MAURICE G. ROBERTS,
JOHN P. BRAMHALL.